United States Patent
Schwartz et al.

(10) Patent No.: US 10,551,635 B2
(45) Date of Patent: Feb. 4, 2020

(54) MICRO FENESTRATED CONTACT LENS

(71) Applicants: The Regents of the University of California, Oakland, CA (US); California Institute of Technology, Pasadena, CA (US)

(72) Inventors: Daniel M. Schwartz, San Francisco, CA (US); Scott E. Fraser, Glendale, CA (US); Morteza Gharib, Altadena, CA (US); Sean A. Mendoza, Alhambra, CA (US); Kevin A. Mendoza, Salt Lake City, UT (US); Nicholas T. Rinella, San Francisco, CA (US)

(73) Assignees: THE REGENTS OF THE UNIVERSITY OF CALIFORNIA, Oakland, CA (US); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 58 days.

(21) Appl. No.: 15/932,290

(22) Filed: Feb. 16, 2018

(65) Prior Publication Data

US 2018/0239168 A1    Aug. 23, 2018

Related U.S. Application Data

(60) Provisional application No. 62/460,631, filed on Feb. 17, 2017.

(51) Int. Cl.
*G02C 7/04* (2006.01)
*G02C 7/16* (2006.01)
(Continued)

(52) U.S. Cl.
CPC ............ *G02C 7/046* (2013.01); *B41M 3/003* (2013.01); *B41M 3/008* (2013.01);
(Continued)

(58) Field of Classification Search
CPC .... G02C 7/046; G02C 2202/10; G02C 7/021; G02C 7/022; G02C 7/041; G02C 7/049;
(Continued)

(56) References Cited

U.S. PATENT DOCUMENTS 3,536,386 A    10/1970 Spivack
4,701,038 A    10/1987 Neefe
(Continued)

FOREIGN PATENT DOCUMENTS

RU    85815    8/2009

OTHER PUBLICATIONS

Cassel, Mitchell, "Changing Lives with Prosthetic Soft Lenses: Prosthetic soft lenses can provide cosmetic, therapeutic, and psychological benefits to patients who need them", Contact Lens Spectrum, Apr. 2010, retrieved from https:/www.clspectrum.com/issues/2010/april-2010/changing-lives-with-prosthetic-soft-lenses on Apr. 18, 2018, (10 pages).

(Continued)

*Primary Examiner* — Jordan M Schwartz
(74) *Attorney, Agent, or Firm* — Kilpatrick Townsend & Stockton LLP (57) ABSTRACT

A sclera or contact lens with an image of an eye that is fenestrated, or uniformly speckled with many sub-millimeter sized transparent regions or holes, is disclosed. The micro fenestrated contact lens can be worn on a strabismic, or misaligned, eye so that its image is aligned with the wearer's dominant eye. The fenestrations allow the wearer to see through the opaque or translucent image printed on the contact lens, thus allowing binocular vision even though his or her strabismic eye is covered.

13 Claims, 7 Drawing Sheets

(51) Int. Cl.
   *B41M 5/00*   (2006.01)
   *B41M 3/00*   (2006.01)
(52) U.S. Cl.
   CPC ............. *B41M 5/0064* (2013.01); *G02C 7/16* (2013.01); *G02C 7/049* (2013.01); *G02C 2202/10* (2013.01)
(58) Field of Classification Search
   CPC .......... G02C 7/104; G02C 7/16; B41M 3/003; B41M 3/008; B41M 5/0064
   See application file for complete search history.

(56) References Cited

U.S. PATENT DOCUMENTS

| | | |
|---|---|---|
| 5,120,121 A | 6/1992 | Rawlings et al. |
| 6,391,057 B1 * | 5/2002 | Schleipman ............ A61F 2/141 446/389 |
| 6,692,481 B2 | 2/2004 | Guerrero |
| 6,726,322 B2 | 4/2004 | Andino et al. |
| 2003/0007123 A1 | 1/2003 | Broderick et al. |
| 2005/0033210 A1 * | 2/2005 | Shahinpoor ............ G02C 7/046 602/41 |
| 2005/0064783 A1 * | 3/2005 | Alfaro ...................... A63H 3/42 446/392 |

OTHER PUBLICATIONS

Collins, et al., "Occulsion properties of prosthetic contact lenses for the treatment of amblyopia", Journal of AAPOS, Dec. 2008, vol. 12, No. 6, pp. 565-568.
Durnian, et al., "The psychosocial effects of adult strabismus: a review", British Journal of Ophthalmology, Sep. 2001, vol. 95, pp. 450-453.
Kanemoto, et al., "Prosthetic Soft Contact Lenses in Japan", Eye and Contact Lens, Dec. 2007, vol. 33, No. 6, pp. 300-303.
Yildirim, et al., "Prosthetic Contact Lenses: Adventure or Miracle", Eye and Contact Lens, May 2006, vol. 32, No. 2, pp. 102-103.

* cited by examiner

MICRO FENESTRATED CONTACT LENS

CROSS-REFERENCES TO RELATED APPLICATIONS

This application claims the benefit of U.S. Provisional Patent Application No. 62/460,631, filed Feb. 17, 2017, which is hereby incorporated by reference in its entirety for all purposes.

STATEMENT AS TO RIGHTS TO INVENTIONS MADE UNDER FEDERALLY SPONSORED RESEARCH AND DEVELOPMENT

NOT APPLICABLE

BACKGROUND

1. Field of the Invention

The present application generally relates to contact lenses having a cosmetic iris pattern for camouflaging strabismus. Specifically it relates to contact lenses with an iris, pupil, and conjunctiva and sclera pattern that is fenestrated with a microarray of tiny transparent fenestrations through which the misaligned eye can see.

2. Description of Related Art

Strabismus, or misalignment of the eyes, affects approximately 2% of adults. Adult strabismus is often due to untreated or recurrent childhood strabismus. Multiple acquired conditions can also affect ocular alignment as an adult, including trauma, orbital disease, cranial nerve palsies, and visual loss. When the eyes deviate secondary to visual loss in one eye, this is termed sensory strabismus. Most cases of sensory strabismus retain some vision in the abnormal eye; however, the limited vision is not sufficient to maintain ocular alignment, causing the eyes to drift inward or outward. Visual loss in childhood or adulthood can be followed by development of sensory strabismus in as little as several weeks. More commonly, it takes at least some months to develop.

In the case of visual loss occurring in early childhood or infancy, a sensory strabismus usually presents as an esotropia, i.e., the affected eye turns inward. Older children and adults with visual loss most often present with an exotropia, i.e., the affected eye turns outward. The causes of sensory strabismus are many, since disease anywhere in the visual pathway can result in visual loss. Thus, corneal scarring, cataracts, dense vitreous hemorrhage, retinal detachment, intraocular tumors, and optic neuropathies are all examples of ocular diseases that can result in sensory exotropia.

Ocular muscle surgery can correct most cases of strabismus, however stable ocular realignment following surgery for sensory strabismus is often not successful. This is because lack of a central fusional drive to maintain ocular alignment is what causes sensory exotropia; this underlying sensory defect is not altered by strabismus surgery. Thus, in the absence of adequate visual function to maintain fusion, even precise surgical alignment will be temporary because the eye will not have a fusional "anchor" to keep it straight. Rarely, surgical realignment of sensory strabismus in which there is disruption of central fusion will result in disabling double vision. Therefore, surgeons and patients alike are frequently frustrated by surgical approaches to sensory strabismus.

Surgical treatment of sensory strabismus is often unsatisfactory, and many persons diagnosed with strabismus have elected to opt out of treatment. Unfortunately, leaving the strabismus untreated is not without consequences. Many studies have shown that patients with strabismus suffer psycho-social consequences. Specifically, being self-conscious of their crossed eyes, these individuals often have a poor self-image, are inhibited from social relationships, and often have difficulty obtaining employment. They can be the subject of ridicule, even in adulthood.

Thus there is a need to develop a non-surgical approach to the treatment of sensory strabismus and other causes of strabismus that are refractory to further surgical therapy. Such a non-surgical approach could also be contemplated in patients with strabismus who wish to avoid or delay surgical intervention.

Occlusion therapy for treatment of amblyopia, a related condition, already makes use of therapeutic contact lenses. Several techniques exist which take advantage of advances in digital photography to produce contact-lens prosthesis for patients suffering from eye disfigurements or traumas.

For example, Russian Patent No. RU85815U1 discloses a soft contact lens with an opaque polymer film depicting an iris with a pupil. It is meant to cover the dominant eye so that strabismic eye is forced to operate more energetically. While cosmetically appealing, these methods completely occlude the target eye, completely eliminating vision from the deviated eye.

There is a need in the art for improved devices for treating strabismus non-surgically.

BRIEF SUMMARY

Generally, a contact lens with a printed image of a pupil, iris, and conjunctiva and sclera that is "fenestrated" with a uniform distribution of tiny transparent regions is disclosed. The contact lens is worn on the strabismic (deviated) eye such that a printed external ocular image camouflages the misaligned pupil and iris underneath to an outside observer. The tiny transparent regions allow the wearer to see through the contact lens. This is similar to how a vehicle or "bus wrap" works. Bus passengers can see to the outside through the bus wrap, while onlookers perceive the advertisement image of the bus wrap and not the passengers inside. Viewing through the partially-occluded strabismic eye, the wearer retains some visual function in the deviated eye and may even achieve some degree of binocularity.

Pattern and substrate details can readily be adjusted to achieve a balance between outward appearance and patient vision. Such a contact lens may be ideal for managing the psychosocial aspects of strabismus. More generally, such contact lenses may be used to manage other types of ocular deformities and provide for other non-medical cosmetic needs.

Some embodiments of the invention are related to a contact lens apparatus for cosmetically improving strabismus. The apparatus includes a contact lens body, a fenestrated printing on the contact lens body, the fenestrated printing continuously spanning at least 10 millimeters (mm) and up to 27 mm in diameter, the fenestrated printing depicting a pupil, an iris, and portions of a conjunctiva and a sclera, the fenestrated printing uniformly interspersed with an array of transparent fenestrations, each transparent fenestration having a maximum dimension of 300 microns ($\mu$m). The fenestrated printing is configured to camouflage a wearer's strabismic pupil and iris while allowing partial vision through the fenestrated printing.

The spacing of the array of transparent fenestrations can bear a transparent-to-opaque ratio for the fenestrated printing of less than 1.5:1. The contact lens can extend over the cornea and sclera so that the deviated eye is obscured from visualization by an outside observer. The whitish portions of the sclera depicted by the fenestrated printing may or may not be symmetric around the depiction of the iris. The shapes, sizes, and/or spacing of the fenestrations can vary randomly or regionally.

The maximum dimension of the fenestrations or shapes can be between 100 μm and 200 μm. The depiction of the pupil, iris, and portions of the conjunctive and the sclera can be from a photograph. The photograph can be of the eye of the actual, intended wearer. The fenestrated printing can be partially opaque or translucent except for the fenestrations. The fenestrations can be holes through the contact lens body or clear, non-printed regions. The array can be spaced regularly or irregularly. The fenestrations can be polygons or circles. The contact lens body material can include polymacron or other soft contact lens materials. Alternatively, the lens can be a rigid scleral lens.

Some embodiments are related to a contact lens apparatus for cosmetically improving strabismus. The apparatus includes a contact lens body, a fenestrated printing on the contact lens body, the fenestrated printing continuously spanning at least 10 millimeters (mm) in diameter, the fenestrated printing depicting a pupil, an iris, and portions of a conjunctiva and a sclera, the fenestrated printing including a uniformly interspersed array of opaque or partially opaque shapes, each shape having a maximum dimension of 300 microns (μm) and surrounded by a transparent mesh, the opaque shapes depicting the pupil, the iris, and the portions of the sclera.

Some embodiments are related to a method of cosmetically treating strabismus while retaining some measure of visual function in the deviated eye. The method includes photographing a pupil, an iris, and portions of a sclera of an eye to create a photograph image, inserting in or otherwise overlaying the photograph image with an array of uniformly interspersed shapes to create a fenestrated image, the shapes indicating regions of transparency, each shape having a maximum dimension of 300 microns (μm), printing the fenestrated image to a contact lens body to create a fenestrated printing, providing the contact lens body with the fenestrated printing to a wearer for application to a strabismic eye, and adjusting the contact lens body such that a pupil depicted by the fenestrated printing is aligned with a pupil of a fellow eye of the wearer, thereby camouflaging the wearer's strabismic eye while allowing partial vision through the fenestrated printing.

The spacing of the array of shapes can bear a transparent-to-opaque ratio of less than 1.5:1. The method can further include editing the photograph image by extending whitish portions of the sclera further from the iris. The editing can include sampling a color or texture of the portions of the sclera in the photograph. The editing can include sampling at least one vein feature of the portions of the sclera in the photograph. The overlaying can include tiling a Von Neumann neighborhood of circles across the photograph image.

DETAILED DESCRIPTION

A contact lens is disclosed that displays an image of an eye with micro fenestrations, tiny imperceivable transparent windows. In addition to a black pupil and colored iris, the image includes portions of the conjunctiva and sclera. A wearer who suffers strabismus wears the contact lens over the misaligned eye. The image of the eye is aligned with the other eye so that it appears that the wearer has normally aligned eyes. The opaque (or translucent) portions of the image printed on the contact lens block an observer from seeing the misaligned eye underneath the lens. Unlike some novelty or purely cosmetic contact lenses with printing, the whitish sclera portion of the image along the tangent is printed to help hide the misaligned pupil and iris. Meanwhile, the tiny fenestrations allow the wearer to partially see out of the contact lens, thus preserving some visual function (e.g., visual acuity, visual field).

Some embodiments provide a non-surgical approach to the treatment of adult strabismus in the absence of diplopia (double vision). A digital image of the deviating eye is transferred to a contact lens that covers both the cornea and sclera. This digital pattern is interspersed with transparent fenestrations. The fenestrations are used to create regions of the printed image that are transparent. The resultant print preserves visual function in the deviated eye by allowing light to reach the patient's retina while providing sufficient opaque area for the printed ocular image that shows ocular alignment and obscures the underlying deviated eye.

Figure 1:
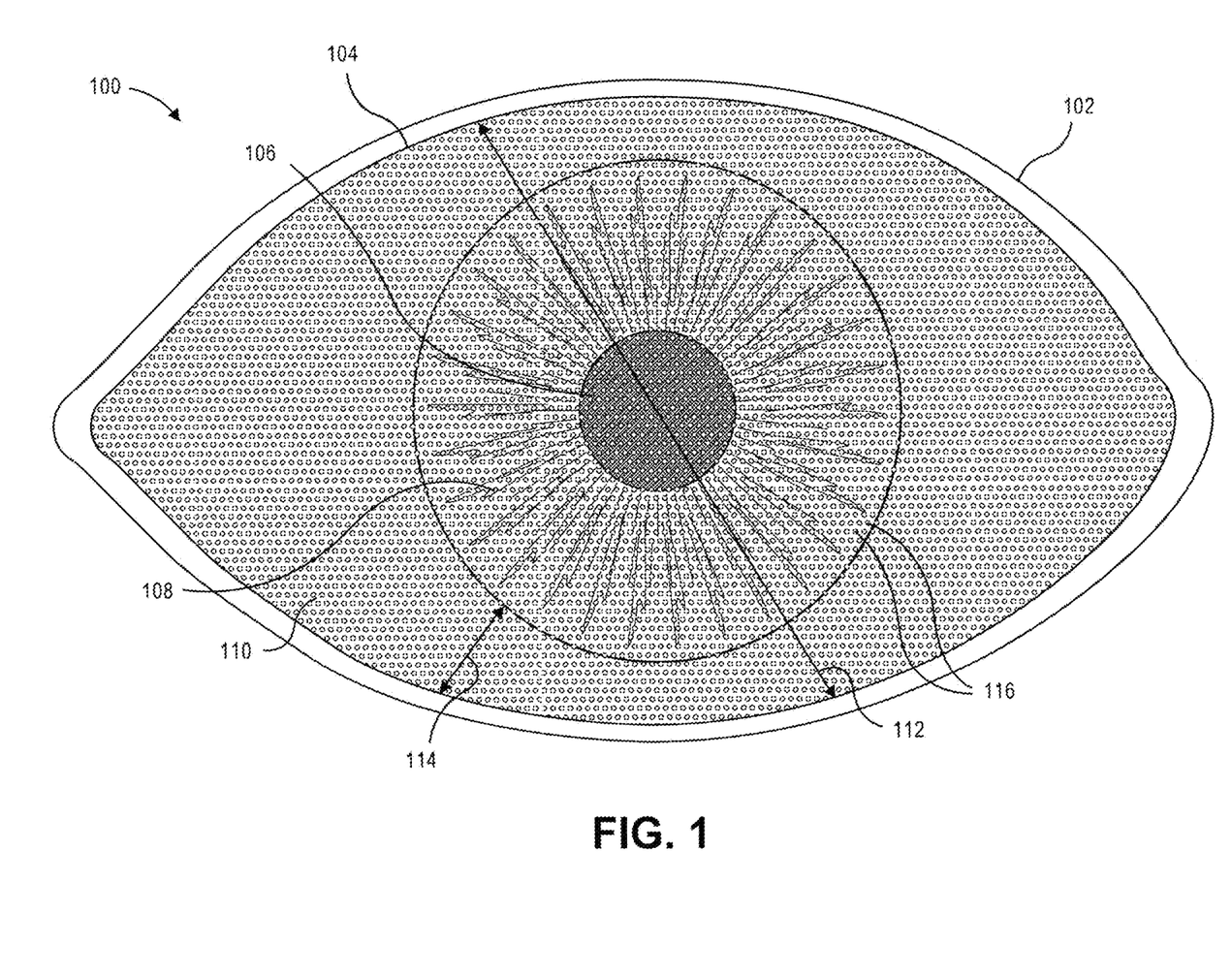
FIG. 1 illustrates a micro fenestrated contact lens in accordance with an embodiment.

FIG. 1 illustrates a micro fenestrated contact lens 100. Polymacron soft contact lens body 102 has printed on it a fenestrated printing 104. Fenestrated printing includes i) opaque or translucent areas depicting an image and ii) transparent "window" areas, or fenestrations.

"Polymacron" includes a hydrophilic polymer of 2-hydroxyethylmethacrylate (HEMA) cross-linked with ethylene glycol dimethacrylate (62%) and water (38%). Polymacron is a material commonly used in soft contact lenses. Other biocompatible materials can be used as well.

A "lens" includes a transparent or translucent substance and does not need to concentrate or disperse light. That is, the lens may act as a window through which light passes and not refract it for corrective vision purposes. Of course, a lens may include corrective capabilities.

In the exemplary embodiment, black pupil 106, colored iris 108, and portions of whitish sclera 110 are printed on opaque regions of fenestrated printing 104. Tiny fenestrations are uniformly dispersed throughout the contact lens, the fenestrations being transparent.

In some embodiments, the shapes are where the opaque, image regions are, while the areas outside of the shapes, i.e., the mesh, are transparent. That is, the pupil, iris, and portions of the sclera are printed on the opaque shapes while the mesh between the shapes is transparent. These embodiments are used when more transparency is required.

In the exemplary embodiment, the fenestrated printing has diameter 112 that continuously spans 11.25 millimeters (mm). In some embodiments, the continuous span can be equal-to-or-greater-than 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, and 27 mm in diameter. The "continuous" span does not require uninterrupted opaqueness. Rather, the continuous span should be substantially covering an area so as to camouflage the area below it.

Depiction of sclera 110 is shown as extension 114. Extension 114 extends at least 2 mm from the depiction of iris 108. This whitish area helps cover a slightly misaligned iris. Larger extensions of the sclera may be used for more deviated irises and pupils. For example, if a wearer's eyes are deviated by 6 mm, then a sclera extension of at least 6 mm could cover the deviated iris and pupil. In order to give room for wobbling and minor variations in deviation throughout the day, the sclera extension may be extended by 1 mm, 2 mm, 3 mm, 4 mm, 5 mm, 6 mm, 7 mm, 8 mm, 9 mm, 10 mm, or more.

The shape 116 of fenestrations include discs or circles with a diameter of less than 300 microns (m). Because a diameter of a circle is its maximum dimension, the maximum dimension of shapes 116 is 300 μm.

A "maximum dimension" of a fenestration or shape is a largest straight-line length of a single fenestration or shape, such as a diagonal of a rectangle or a major axis of an ellipse, or as otherwise known in the art.

Other open or closed shapes can be employed, such as slits, triangles, rectangles, pentagons, hexagons, or other regular or non-regular polygons. Curved shapes can also be employed, such as circles, ovals, S-shapes, bulls eyes, waves, and others. The sizes and shape can vary randomly or regionally.

The sizes of the fenestrations can vary such that small fenestrations (e.g., below 100 μm), medium fenestration (e.g., 100-200 μm), and large fenestrations (e.g., 200-300 μm) are randomly interspersed. Or there can be regions in which the sizes are large or small. For example, fenestrations around the periphery of the contact lens may be larger than those near the center. Less coverage may be needed in the periphery because there is coverage by eye lashes, eye lids, and other natural features. The spacing of the fenestrations can vary from sparse to dense in the same manner. For example, a smaller spacing may be designed near the periphery.

Figure 2:
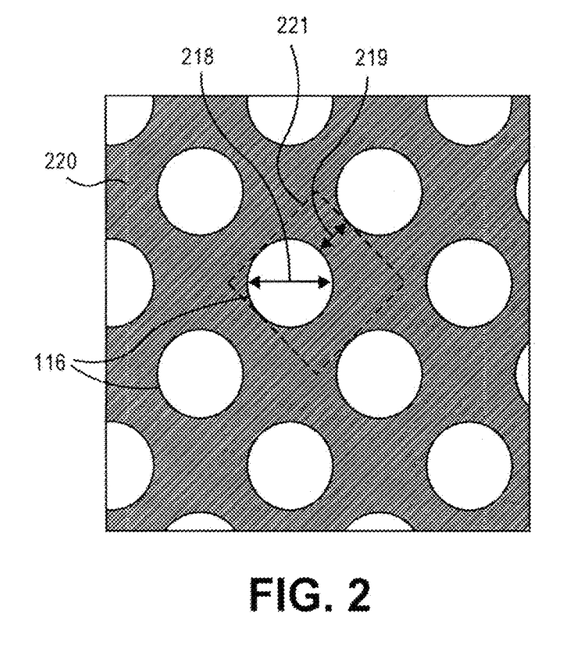
FIG. 2 is a close up of the uniformly dispersed transparent shapes of FIG. 1.

FIG. 2 is a close up of the uniformly dispersed transparent fenestrations of FIG. 1. It is a "negative print," meaning that the opaque image is printed in the area outside of the shapes. Thus, the shapes are the fenestrations in the fenestrated image. Opaque image 220 is fenestrated with uniformly distributed circle shaped fenestrations 116. Each circle has diameter 218.

The spacing between the fenestrations in the exemplary figure is shown as regular, periodic. That is, the distances between the fenestrations are equal such that there are rows and/or columns. In some embodiments the spacing may be irregular, varying, random. It is preferred that the fenestrations are spread out or otherwise uniformly dispersed, at least in the region where the underlying pupil and iris lay. This is so that the eye has plenty of windows through which to see to the outside but the opaque portions effectively mask the misaligned eye underneath.

A "uniformly dispersed" set of shapes or fenestrations includes those that are generally scattered or distributed over an area without overall clumping, or as otherwise known in the art. The scattering does not need to be exactly uniform, as with an predefined pitch or center-to-center spacing. Rather, the dispersion may be random or otherwise nonperiodic or irregular.

One can quantify the transparency of the fenestrated printing. In the exemplary embodiment, diameter 218 of the circular fenestrations or dots is 250 μm, and their edge to edge spacing 219 is 150 μm. Each circle and its surrounding area are imagined as belonging to a unit cell, one of which is labeled in the figure as unit cell 221. The dimensions give a square unit cell of 250+150 μm=400 μm on edge. The area of a transparent circle is $\pi r^2 = \pi*(250 \ \mu m/2)^2 = 49,087 \ \mu m^2$. The area of the square unit cell is 400 μm*400 μm=160,000 μm². The opaque area of the unit cell is the area of the square (160,000 μm²) minus the area of the circle (49,087 μm²), which equals 110,913 μm².

Thus, the "transparent-to-opaque ratio" of the fenestrated printing is 49,087 μm²:110,913 μm². This is approximately 5:11, or 0.44:1.

A "percentage transparency" is another way of measuring this. The percentage transparency is the transparent area (49,087 μm²) divided by the unit cell's total area (160,000 μm²), which is approximately 0.31, or 31% transparent.

A "percentage opaqueness" is the opaque area (110,913 μm²) divided by the unit cell's total area (160,000 μm²), which is approximately 0.69, or 69% opaque. Note that the percentage opaqueness is 1 minus the percentage transparency.

Instead of merely not printing in the transparent areas, the contact lens may be physically perforated by a number of holes, each hole being a "transparent" area. The holes may be created by lithography or other microfabrication techniques, or as otherwise known in the art.

Figure 3:
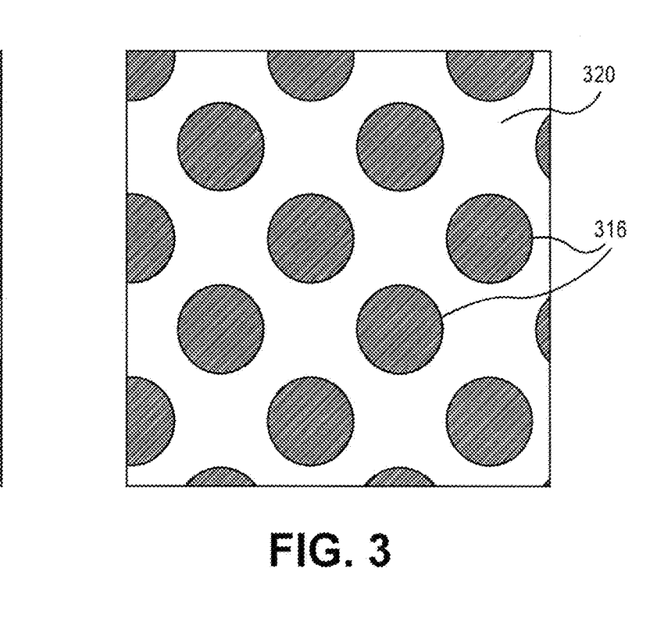
FIG. 3 is a close up of uniformly dispersed partially opaque shapes in accordance with an alternative embodiment.

FIG. 3 is a close up of uniformly dispersed opaque shapes, in accordance with an embodiment. It is a "positive print," meaning that the opaque image is printed inside the shapes and the rest is transparent. The fenestrated image includes uniformly distributed opaque dots 316 surrounded by transparent area 320.

Figure 4:
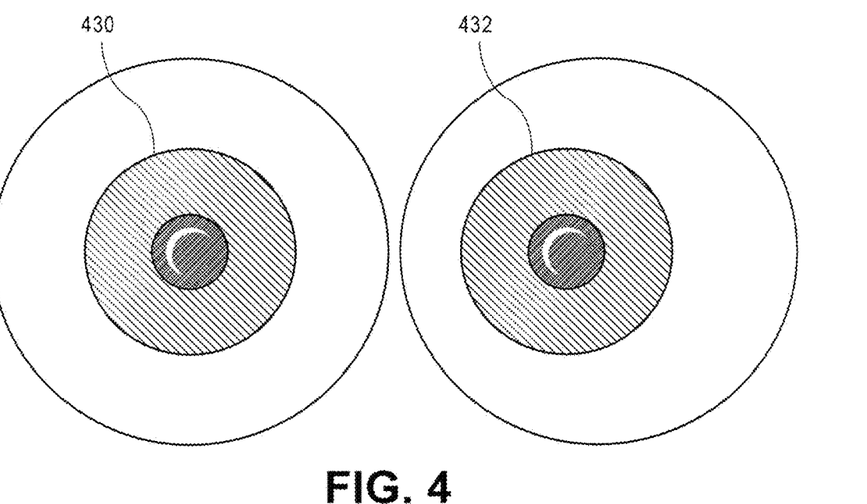
FIG. 4 illustrates strabismus in a pair of eyes, shown without surroundings for clarity.

FIG. 4 illustrates strabismus in a pair of eyes, shown without surroundings for clarity. Iris 430 of the dominant eye looks straight ahead while iris 432 of the strabismic eye is turned inward. The condition is termed esotropia.

Figure 5:
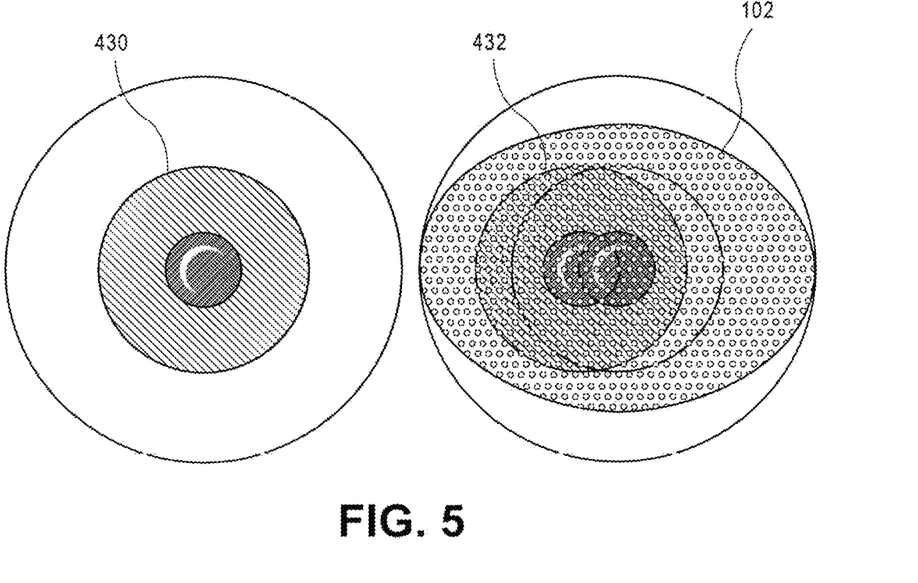
FIG. 5 illustrates a micro fenestrated contact lens on the strabismic eye of FIG. 4 in accordance with an embodiment.

FIG. 5 illustrates a micro fenestrated contact lens on the strabismic eye of FIG. 4. Micro fenestrated contact lens 102 is placed on the strabismic eye to cover iris 432 of the strabismic eye. Contact lens 102 is placed such that the depicted image of the pupil and iris are aligned with iris 430 of the dominant eye. The actual iris 432 and pupil underneath contact lens 102 are occluded from a casual observer by the opaque portions of the contact lens, including the outer regions that depict the sclera. They are shown in the figure in order to show the underlying alignment.

The figure shows a symmetric contact lens in which the diameter of the depicted sclera is equally distributed around the iris. One of skill in the art will readily recognize that portions of the depicted sclera that are opposite (in this case, temporal) from the underlying strabismic iris and pupil may not need to be present. If those portions of the sclera are not printed, then the depiction of the sclera may be unsymmetric about the iris. This may be perfectly acceptable for some wearers.

Figure 6:
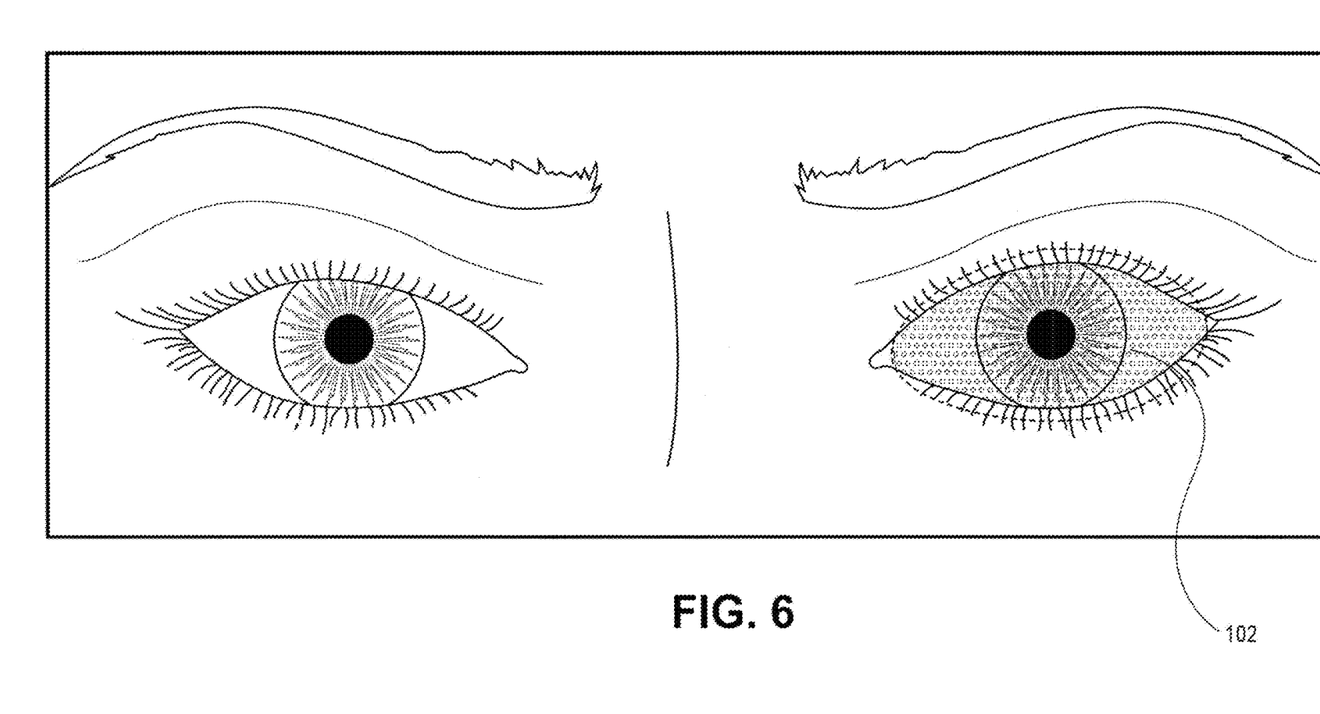
FIG. 6 illustrates a micro fenestrated contact lens on a wearer in accordance with an embodiment.

FIG. 6 illustrates a micro fenestrated contact lens on a wearer in accordance with an embodiment. Micro fenestrated contact lens 102 covers the strabismic eye. To a casual observer, the wearer appears to have normal ocular alignment (i.e., no strabismus), un-afflicted with strabismus. Thus, the contact lens effectively camouflages the wearer's strabismus. Further, the wearer's strabismic eye is able to see through the image because of the tiny windows or holes in the contact lens.

To allow both patient vision and an acceptable cosmetic appearance, the shape area and shape spacing of the fenestrations should be constrained. Due to the size of the pupil, it has been found that an upper fenestration size limit of 300 µm in diameter is sufficient to both provide user vision and provide a reasonable area of the printed image. The smaller the individual fenestrations, the harder it is for outside observers to detect the pattern. Practically, the lower bound for fenestration size may be equal to the width of the printer's pixel. However, it is sometimes preferred that the fenestration width be kept approximately an order of magnitude larger than the pixel width to allow for geometric modeling of opacity. Non-digital printing methods may also be used.

Fenestrated printing may include films, inks of pigments or dyes, physically altered surface features, or other printing as known in the art. The printing should avoid bleeding ink and be fine enough to allow a dispersed array of small non-printed sections, fenestrations, within an image.

The microfenestrated print can be produced flat with no distortion, or it may be modified to receive light in any direction.

Figure 7:
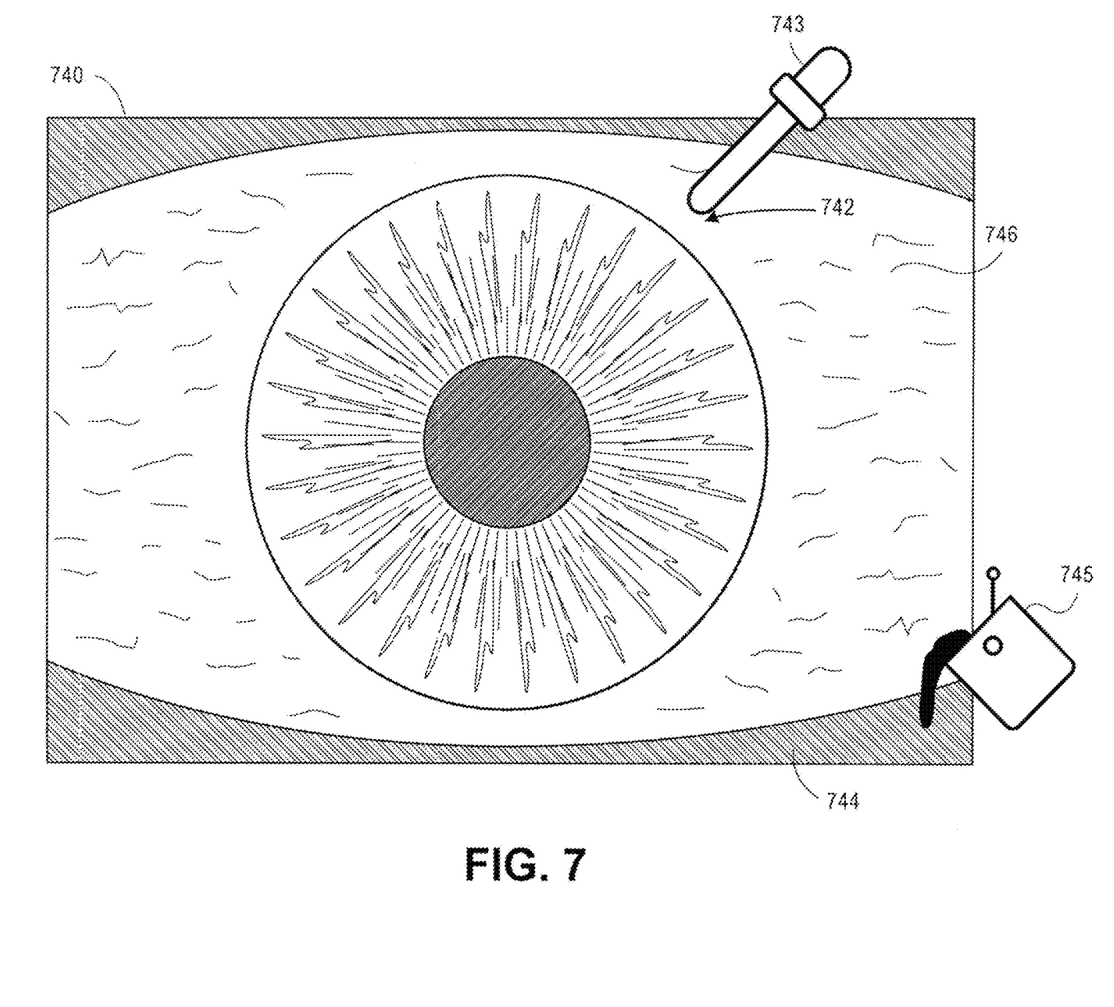
FIG. 7 illustrates digital editing of an image of an eye for preparation of a contact lens in accordance with an embodiment.
Figure 8:
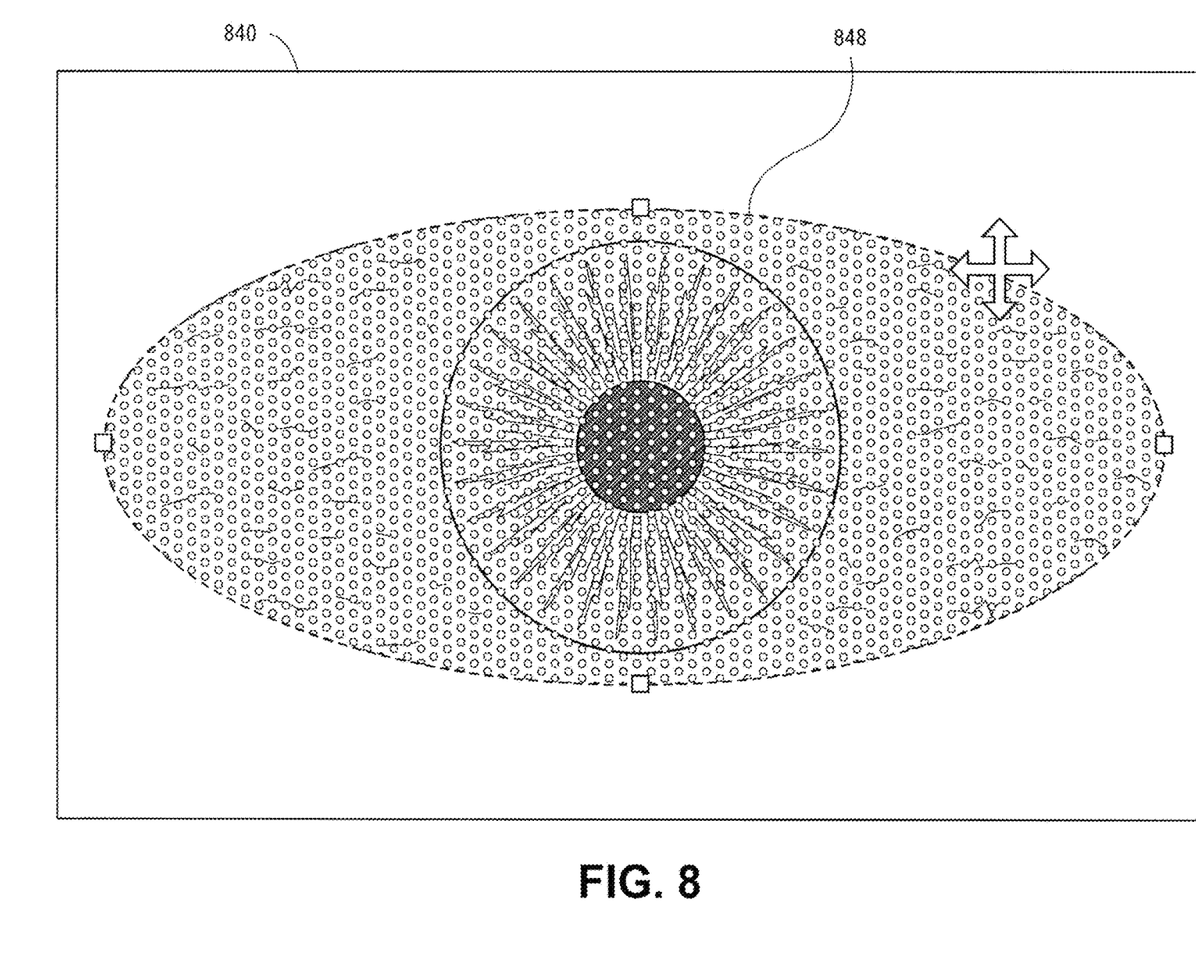
FIG. 8 illustrates further digital editing of an image of an eye for preparation of a contact lens in accordance with an embodiment.

FIGS. 7-8 illustrate digital editing of an image of an eye for preparation of a contact lens in accordance with an embodiment.

As a general example, a patient with 20/400 vision from anterior ischemic optic neuropathy maintains inferior visual field. He has a large angle sensory exotropia. He has had a previous operation to correct the strabismus, but one year later, the sensory exotropia had recurred. He is bothered by the cosmetic appearance of the recurrent strabismus but does not want further surgical intervention.

First, the patient is fitted with a contact lens. A digital photographic image of his eye is captured and processed. The eyelids may be held wide open in order to image as much of the sclera as possible, or the processing may involve an expansion of the sclera.

FIG. 7 shows image 740 with digital editing tools. A color, texture, and/or feature sample 742 near eyedropper 743 is digitally taken. Colors can include that of the iris, sclera, and conjunctival vascular features, or other natural features of the photographed eye.

The sampled color, texture, and/or other features of the sclera are expanded outward from the iris by applying fill tool 745 to non-sclera regions such as eyelid 744. These and other digital editing tools can be used to enhance the image.

A fenestration pattern is prepared by tiling a Von Neumann neighborhood of circles across the image. This is done inside a computer program, which renders each circle via the Midpoint Circle Algorithm to prevent shape distortion at small sizes and spacings. Additional patient considerations, such as the presence of photophobia (light sensitivity) as occurs with cone dystrophy, uveitis, and migraine, can be entered into the program. The program then provides a narrow range of parameters appropriate for the patient, with a diameter and spacing of the fenestrations typically between 1-300 µm. The generation of these patterns is not limited to this method alone.

This pattern is then used to determine which areas of the digital eye image to interrupt (with clear regions). The goal is so that when the patient wears the printed scleral contact lens, he or she is able to see through the fenestrations and maintain his or her inferior peripheral visual field. An observer looking at the patient perceives a natural external appearance of the affected eye with no underlying ocular deviation evident.

FIG. 8 illustrates the selection of a circular image 848 with the fenestration pattern applied. This fenestrated image is then printed to a contact lens to create a fenestrated printing. Before printing, other features may be tweaked, like colorization matching to the opposing eye or ultraviolet protection.

Figure 9:
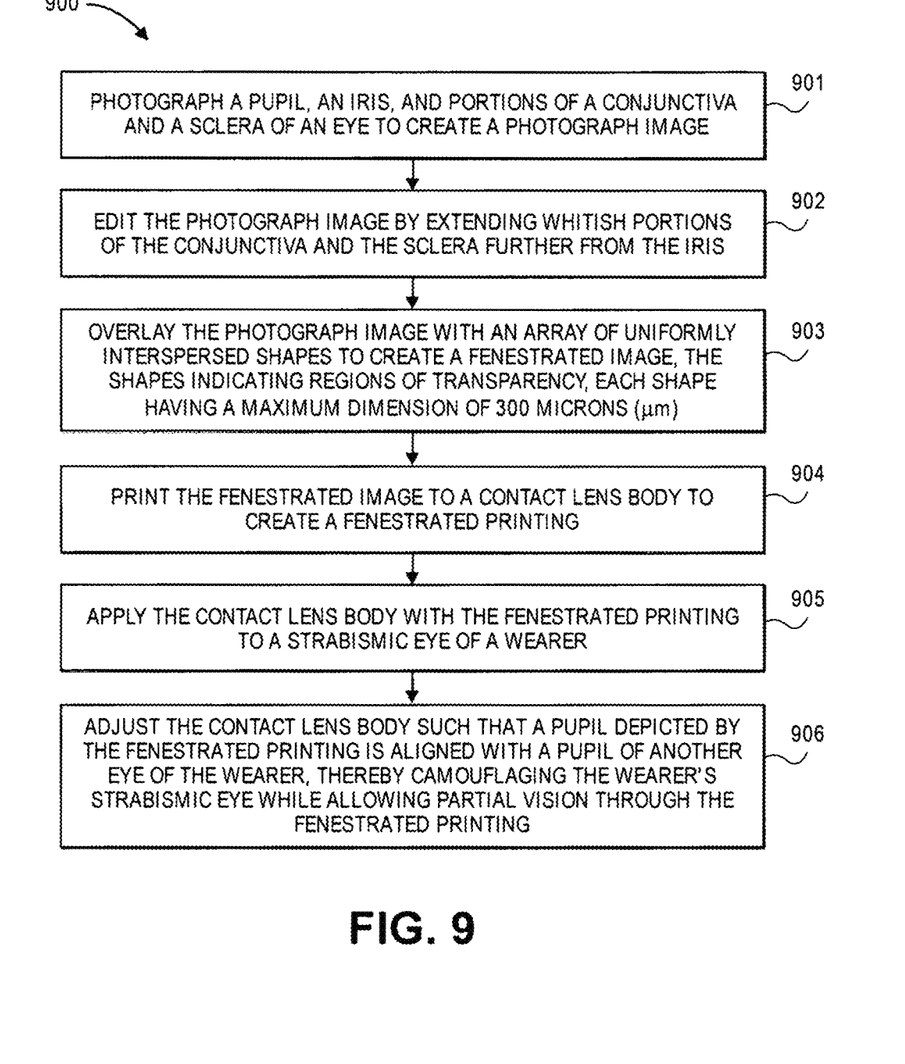
FIG. 9 is a flowchart illustrating a process in accordance with an embodiment.

FIG. 9 is a flowchart illustrating process 900 in accordance with an embodiment. In operation 901, one photographs a pupil, an iris, and portions of a sclera in an eye in a single camera shot to create a photograph image. In operation 902, the photograph is edited by extending whitish portions of the sclera further from the iris than were in the original photograph. In operation 903, the photograph image is overlaid with an array of uniformly interspersed shapes to create a fenestrated image, the shapes indicating regions of transparency (or opaqueness), each shape having a maximum dimension of 300 microns (µm), a spacing of the array of shapes bearing a transparent-to-opaque ratio of less than 1:1. In operation 904, the fenestrated image is printed to a contact lens body to create a fenestrated printing. In operation 905, the contact lens body with the fenestrated printing is applied to a strabismic eye of a wearer. In operation 906, the contact lens body is adjusted such that a pupil depicted by the fenestrated printing is aligned with a pupil of another eye of the wearer. This camouflages the wearer's strabismic eye while allowing partial vision through the fenestrated printing.

The invention has been described with reference to various specific and illustrative embodiments. However, it should be understood that many variations and modifications may be made while remaining within the spirit and scope of the following claims.

What is claimed is:

1. A contact lens apparatus for cosmetically improving strabismus comprising:
   a contact lens body;
   a fenestrated printing on the contact lens body, the fenestrated printing continuously spanning at least 10 millimeters (mm) in diameter, the fenestrated printing depicting a pupil, an iris, and portions of conjunctiva and portions of a sclera, the fenestrated printing uniformly interspersed throughout an entirety of the fenestrated printing with an array of transparent fenestrations, each transparent fenestration having a maximum dimension of 300 microns (µm),
   wherein the fenestrated printing is configured to camouflage a wearer's strabismic pupil and iris, and the transparent fenestrations are dimensioned and spaced to allow partial vision through the fenestrated printing.

2. The apparatus of claim 1 wherein a spacing of the array of transparent fenestrations bears a transparent-to-opaque ratio for the fenestrated printing of less than 1.5:1.

3. The apparatus of claim 1 wherein portions of the conjunctiva and sclera depicted by the fenestrated printing extend at least 2 mm from the depiction of the iris, thereby being configured to cover at least a portion of a deviated iris of a wearer.

4. The apparatus of claim 1 wherein whitish portions of the sclera depicted by the fenestrated printing extend to a diameter of at least 12 mm.

5. The apparatus of claim 1 wherein whitish portions of the sclera depicted by the fenestrated printing are not symmetric around the depiction of the iris.

6. The apparatus of claim 1 wherein shapes and/or sizes of the fenestrations vary randomly or regionally.

7. The apparatus of claim 1 wherein the maximum dimension of the fenestrations is between 100 μm and 200 μm.

8. The apparatus of claim 1 wherein the depiction of the pupil, iris, and portions of the conjunctiva and sclera are from a photograph.

9. The apparatus of claim 8 wherein the photograph is of an eye of an intended wearer.

10. The apparatus of claim 1 wherein the fenestrated printing is opaque or translucent except for the fenestrations.

11. The apparatus of claim 1 wherein the fenestrations are holes through the contact lens body.

12. The apparatus of claim 1 wherein the fenestrations are polygons or circles.

13. The apparatus of claim 1 wherein the contact lens body comprises polymacron or is a rigid, scleral lens.

* * * * *